350-286 CROSS REFERENCE SEARCH ROOM

Feb. 25, 1969 F. J. REED 3,430,033

CARD READING APPARATUS

Filed Sept. 15, 1965 Sheet 1 of 2

INVENTOR.
FRANK J. REED
BY
Harry W. Hargis III
AGENT

Feb. 25, 1969 F. J. REED 3,430,033

CARD READING APPARATUS

Filed Sept. 15, 1965 Sheet 2 of 2

INVENTOR.
FRANK J. REED
BY
Harry W. Hargis III
AGENT

3,430,033
CARD READING APPARATUS

Frank J. Reed, Philadelphia, Pa., assignor to Philco-Ford Corporation, Philadelphia, Pa., a corporation of Delaware Filed Sept. 15, 1965, Ser. No. 487,367
U.S. Cl. 235—61.11 13 Claims
Int. Cl. G06k 7/14

This invention relates to card reading apparatus, and more particularly to reading apparatus which utilizes optical sensing means to read cards having data-bearing portions, for example punched cards.

It is a general objective of the invention to provide improved card reading apparatus of the aforementioned type, the construction of which is featured by a high degree of compactness and lends itself to accurate and dependable operation.

Another objective of the invention is to provide improved card reading apparatus which facilitates arrest and rereading of cards when required.

A further objective of the invention is to provide novel card reading apparatus of a construction especially adapted to enhance establishment and maintenance of synchronism between operating elements thereof.

It is still a further objective of the invention to provide card reading apparatus utilizing light sensing elements in which members of the card drive means serve as means for directing light onto the sensing elements.

In achievement of the foregoing as well as other objectives, the invention comprises optical reading apparatus which utilizes unique rotating drum means to receive a punched card from an input bin, and to hold and transport the card while it is being read by an associated photo-diode assembly. This drum means preferably comprises a pair of identical halves of optically transparent material in each of which is formed a circular prism having right-angular cross-section in planes containing the drum axis. The two prisms are disposed and adapted to receive light from external sources, directed generally axially of the drum, and to reflect such light radially of the drum through holes in the punched cards which conform to the cylindrical surface of the transparent drum as it is rotated. It is a feature of the novel drum construction, and its associated detector, that it accommodates re-reading of cards, if necessary due for example to an error, before they are routed to a card output bin, and, if such error persists, provides for automatically offsetting the card in question relative to the main stack in the output bin.

The manner in which the foregoing objectives may best be achieved will be more clearly understood upon consideration of the following description, taken in light of the accompanying drawing in which.

Figures 1, 1A:
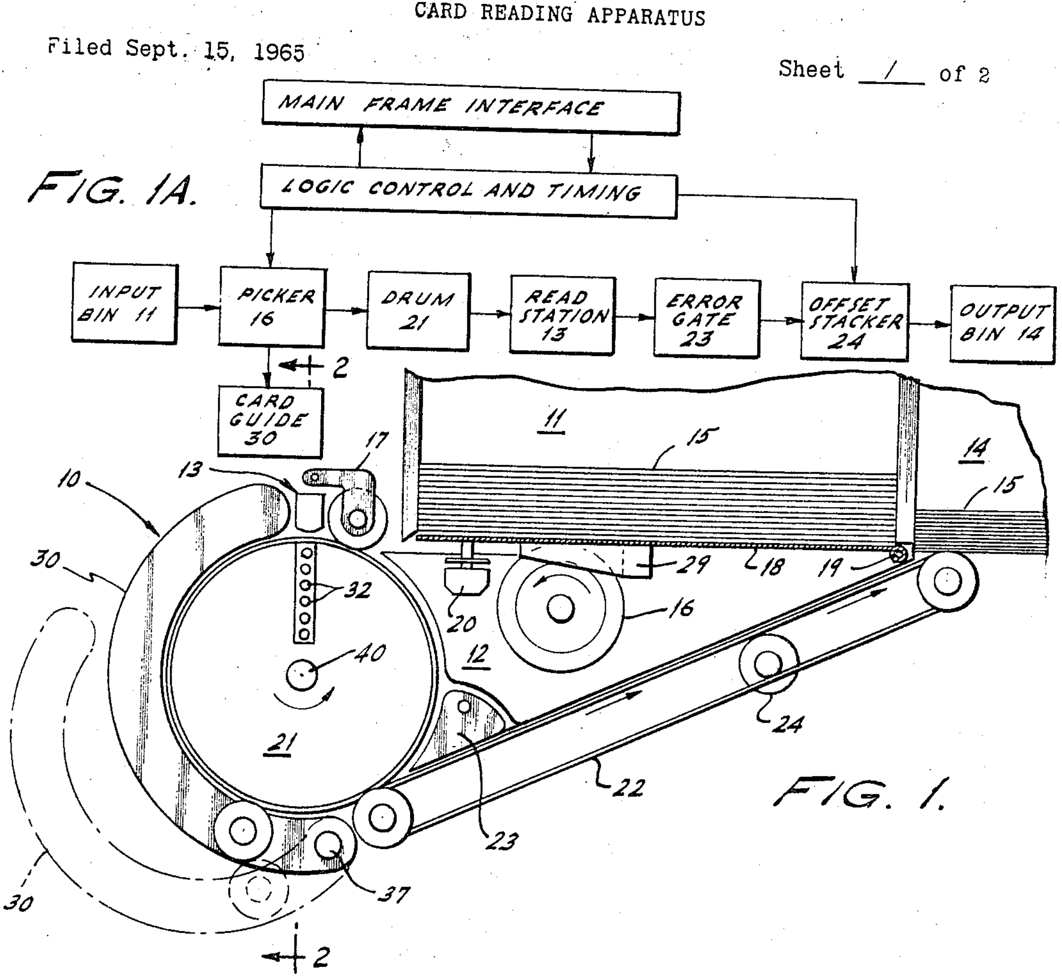
FIGURE 1 is a partial elevational view of a preferred form of apparatus embodying the invention.
FIGURE 1A is a schematic diagram representative of the operating mode of apparatus illustrated in FIGURE 1.

With more detailed reference to the drawing, and first to FIGURES 1, 1A, 2 and 3, a card reading apparatus 10 embodying the invention comprises, generally, an input bin 11, a transport mechanism 12, a read station 13, and an output bin 14. The construction and arrangement of apparatus 10 is such that in its operation, as determined by the schematically illustrated Logic Control and Timing Means, cards 15 are picked one at a time from input bin 11 and transferred to read station 13 where the punched holes 15*a* (see FIGURE 3) are translated to data bits and transferred to a computer (not shown) operably associated with the reader via the Main Frame Interface illustrated in block form in the schematic FIGURE 1A. The apparatus would of course, include means of known design for operationally interconnecting the several illustrated components hereinafter to be more fully described.

After a card 15 is successfully read, as will be indicated by its compliance with a verification check provided for by known means in the computer (not shown) with which the card reader is associated, it is transported to output bin 14 and stored, preferably in the sequence in which it was stacked. Cards that do not comply with the verification check also are routed to the output bin, but are displaced to protrude slightly from the main stack, by mechanical means hereinafter to be described and operable by known suitable signal means associated with the computer. A card 15 may, if desired, be re-read before being routed to the output bin upon operation of means to be described later.

Considering in more detail the construction and operation of the apparatus 10, cards 15 are loaded into input bin 11, and upon a demand signal from suitable means, not shown, are picked one at a time by a vacuum assisted picker roller 16, of known type, suitably positioned adjacent input bin 11. The input bin is provided with a plate 18 pivotally mounted at 19 adjacent roller 16, and a actuator 20 is selectively operable to move plate 18 toward and away from roller 16 and a suitably presented vacuum manifold 29. The plate 18 has an opening (not shown) through which roller 16 is extensible, upon downward pivotal movement of plate 18, frictionally to engage and drive a card toward the juncture of pinch roller assembly 17 and the drum 21. In accordance with known techniques, the vacuum manifold 29 is arranged and adapted to hold the card to be fed against the plate 18 when picker roller 16 is driven. The remainder of the card stack will not follow, due to its inertia, and the driven card 15 is easily separated from the stack by roller 16 for drive by pinch roller assembly 17. Plate 18 is returned immediately to its upper position, to await the next demand signal. Plate 18 may be provided with a conventional stripper knife (not shown) to assist vacuum manifold 29 in separating a card to be read from the stack in input bin 11.

After being picked, a card 15 is driven between pinch roller assembly 17 and the rotatable prism drum 21. Roller assembly 17 preferably comprises three axially aligned rollers, only one of which is shown, each individually spring loaded for frictional drive with drum 21. A card guide 30 is contoured to the periphery of drum 21, in close adjacency thereto, so as to hold a card securely to the latter in order that it can be frictionally driven past read station 13, where it is read photoelectrically. After a card has been read, it continues around drum 21 and is fed onto the transport belt 22 that drives it into output bin 14.

Figures 2, 3:
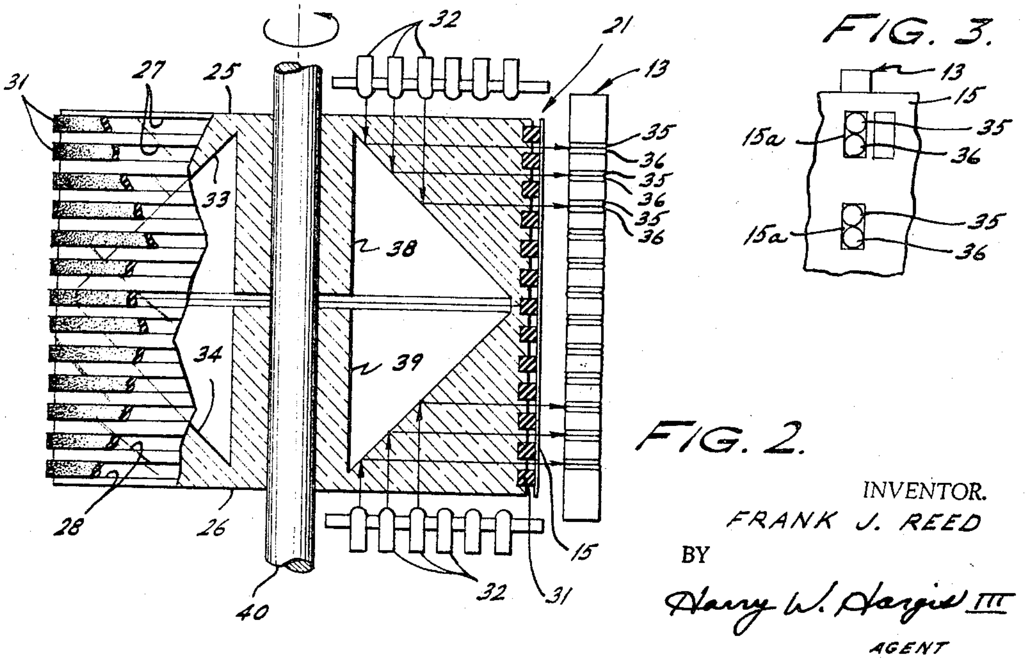
FIGURE 2 is a sectional view of drum apparatus illustrated in FIGURE 1, and looking in the direction of arrows 2—2 applied thereto.
FIGURE 3 is a fragmentary showing, on an enlarged scale, of a portion of the apparatus seen in FIGURE 2.

In further particular accordance with the invention, and with especial reference to FIGURE 2, drum 21 comprises a pair of identical, axially aligned halves 25 and 26 of optically transparent material, such for example as a clear plastic. For certain purposes, the drum 21 may comprise a single right angle prism.

Drum halves 25 and 26, respectively comprise circular right angular prisms 33 and 34 arranged as shown about respective hub portions 38 and 39, each of which is keyed, for example by a press fit, to rotatable shaft 40. Drum 21 is rotatable, at a predetermined suitable speed, by motor means (not shown) coupled with shaft 40 and controlled in known fashion, for example through means associated with the Main Frame Interface and the Logic Control and Timing Means (FIGURE 1A).

A plurality of laterally spaced, circumferential grooves 27 and 28 extend about the peripheries of the respective drum halves, and rubber drive rings 31 are seated in the grooves so as to be disposed and presented frictionally to engage a card 15. While no card 15 is shown in the process of being driven in FIGURE 1, there is illustrated in section in FIGURE 2 a card 15 frictionally engaged by belts 31 in the generally longitudinal areas of the card between punched holes 15*a* (FIGURE 3). Pinch roller assembly 17 and guide 30 hold a card against the rubber drive rings 31 for frictional drive of the card by the rings past the dual read heads 35 and 36 (FIGURE 3) of station 13, and into the card guide 30. The card guide is mounted for hinging movements about a pivot 37 to facilitate cleaning, and to permit removal of cards in the event they should become jammed in the mechanism.

Exciter lamps 32 for the optical system are positioned in a line extending across opposite ends of drum 21 and are operable to emit individual, spaced beams of light paralleling the drum axis. The material of the drum 21 is so selected that its refractive index relative to the refractive index of air will cause each beam of light directed normal to the end surface of the drum to be reflected 90° by the sloping face of a corresponding prisms 33 and 34, as illustrated in FIGURE 2, and directed normal to the drum surface between a pair of rubber drive rings 31, through suitably positioned holes in the card, thence onto its corresponding dual photo-diode read heads 35 and 36. The drive rings are opaque, and thereby serve as masks for preventing interrow cross talk by ensuring the channeling of each light beam through its corresponding hole 15*a*. Dual heads are provided for increased reliability, since both photodiodes 35 and 36 must be energized before a punched hole is accepted.

If in the reading process an error is indicated or suspected, the apparatus has means of known design associated therewith to afford it the optional capability of rereading the card by providing for activation of the pivotally mounted error gate 23 to prevent picking the next card and provide for rerouting the card back under pinch roller assembly 17. Such means may comprise elements of the Main Frame Interface, the Logic Control and Timing means, as well as elements of the computer (not shown). The card will be then reread at read station 13, and, if the error still exists, error gate 23 will close and route the card along transport belt 22 where a suitably positioned pulley 24 is operative in correspondence with actuation of gate 23 to offset the card relative to its normal position on belt 22, and before it enters output bin 14. This offset is directly indicative of the erroneous card or cards in output bin 14. Cards may also be offset to sort them into groups, if desired. Offset pulley 24 does not operate to engage the cards during error-free operation unless it is desired to offset a card for grouping purposes. When a card is to be offset, because of error, or for grouping purposes, pulley 24 is energizable and operable to drive the card relative to the belt 22 for approximately one half inch. This displacement of the card is maintained on the transport belt and in the output bin 14 to which the card is fed, the displaced card extending approximately one half inch beyond the remainder of the deck in bin 14.

While the term "punched card" has been used in describing the record media, it will be understood that the invention contemplates record media of other apertured types, irrespective of the manner in which the indicia apertures are formed. It is also contemplated that the cards per se may be transparent, with the indicia comprising opaque dots instead of apertures.

Figure 5:
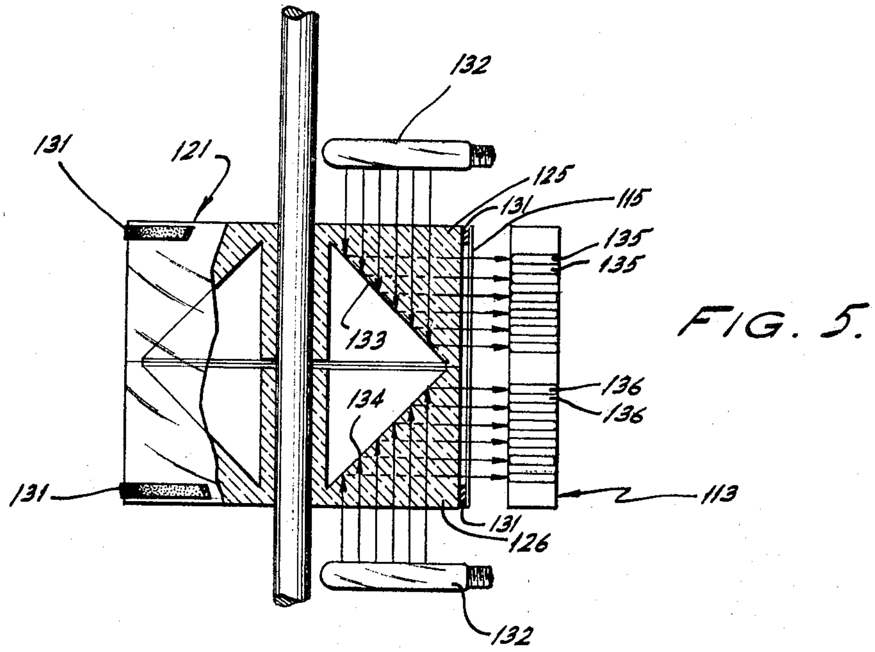
FIGURE 5 is a view, partly in section, looking generally in the direction of arrows 5—5 applied to FIGURE 4.
Figure 4:
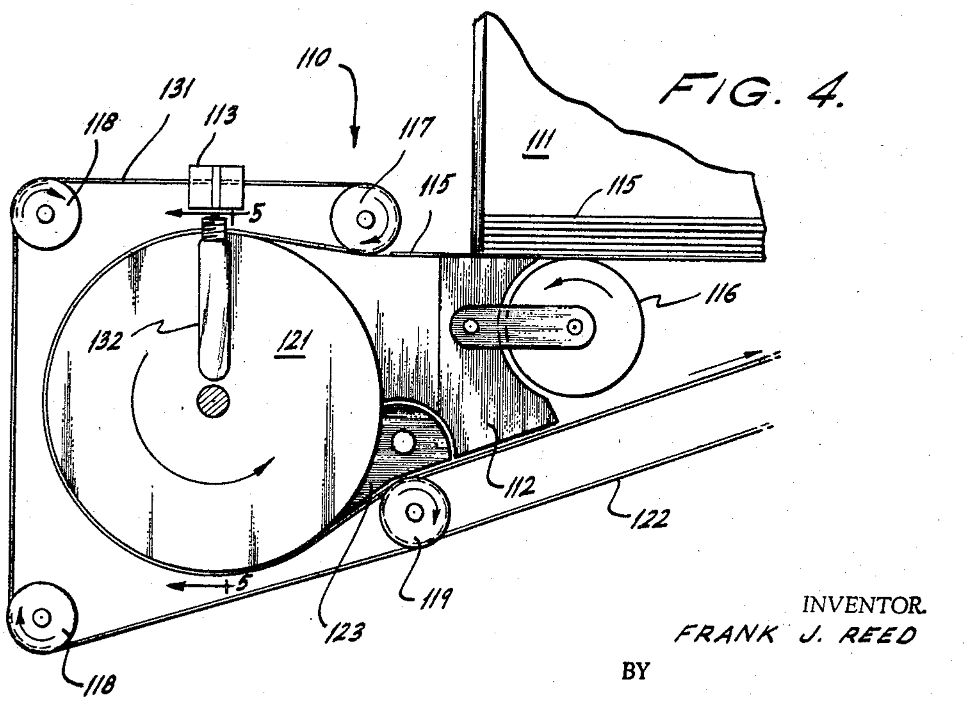
FIGURE 4 is a view similar to FIGURE 1, and illustrating a modified embodiment of the invention.

With reference to FIGURES 4 and 5, a card reading apparatus 110, comprising a modified embodiment of the invention, includes an input bin 111, a transport mechanism 112, a read station 113, and an output bin (not shown). Cards 115 are arranged in the input bin in such manner that the picker roller 116, upon a suitable demand signal, moves each card into a position in which it is engaged by a pair of belts 131 that extend over a pair of pinch drive rollers 117, only one of which is shown. Belts 131 pass also over pairs of idler pulleys 118 and pinch rollers 119. The belts 131 also pass over light transmissive drum 121 comprising a pair of axially aligned circular prisms 133 and 134, similar to those of the previous embodiment.

Pairs of rollers 118, 117, and 119 are so positioned that the belts 131 extend over the end portions of the drums. In such position, the belts will engage the sides of the cards as they are fed from the storage bin and will hold them against the drum as it is rotated in accordance with the directional arrow shown in FIGURE 5.

A pair of lamps 132 are provided adjacent the ends of drum 121 and are so positioned as to direct light through the drum ends for reflection by the prisms 133, and subsequent transmission through the openings in cards 115, and finally onto the photodiodes 135 and 136.

As in the previous embodiment, an error gate 123 is provided and is angularly displacable in response to results of a verfication check indicating an error and rendered by the computer (not shown) through an interface as shown on FIGURE 1A, in order that the card may again be fed past the read station 113.

When no error exists, the gate 123 remains in the illustrated position and feeds the card onto a separate conveyor belt 122 which extends also over the pinch roller 119 at the left hand end of the belt 122. The other end of belt 122 (not shown) is so positioned as to feed the card into the output bin.

From a consideration of both embodiments of the invention it will be appreciated that incorporation of circular right angle prisms in transparent drums permits the light sources to be disposed outside a transparent transport drum, where they are readily accessible. In such an arrangement, the drum, and punched cards transported thereby advantageously are subject to minimal heating by the light source.

It will be appreciated that the transport drum is so configured that a card transported thereby will be completely past the read station sufficiently prior to movement of its leading edge to the error gate to permit operation of the gate, if it be desired to re-read the card, thus ensuring accuracy and flexibility of operation.

I claim:

1. In card reading apparatus, drum means comprising optically transparent material in which is formed a circular prism coaxial with said drum means, means for directing light toward the end of said drum means for impingement upon a reflective face of said prism, light sensitive means for receiving said light as it is reflected by sad face of said prism generally radially of said drum means and through peripheral, curved surface portions thereof, means for rotating said drum means about its central axis, and means for holding a card in such position with respect to said drum means that data bearing portions of the card are aligned with said light sensitive means and modulate the transmission of said reflected light onto the latter.

2. Apparatus according to claim 1, and characterized in that said means for holding a punched card comprises arcuate card engaging structure extending over a curved surface portion of said drum means, said card being held, as said drum means is rotated, between the curved surface portion and said arcuate structure.

3. Apparatus according to claim 2, and further characterized in that said arcuate structure comprises a member disposed in spaced relation to said curved surface portion of said drum means.

4. Apparatus according to claim 2 and further characterized in that said arcuate structure comprises belt means extending over said curved surface portions of said drum means.

5. Apparatus according to claim 1, and characterized in that said drum mean has a pluarlity of circumferential grooves formed in said curved surface portions, said grooves being so spaced and disposed that the reflected light passes between said grooves and through apertures in said card, and belt means comprising a plurality of individual belts each in a corresponding groove and effective to mask said light for transmission only through a corresponding aperture.

6. Apparatus according to claim 5, and characterized in that said means for holding a card over said drum means comprises an arcuate, card engaging member extending over a curved surface portion of said drum means, said card being held, as said drum means is rotated, between the curved surface portion and said arcuate structure.

7. Apparatus according to claim 1 and further characterized by the inclusion of output bin means for cards that have been read, drive belt means disposed and adapted to receive a card after it has been read and to transport the same to said bin means, said belt means being adapted to be driven at predetermined linear speed corresponding to the circumferential speed of said drum means, and means providing for selective movement of said card relative to said belt in response to a predetermined signal of suitable origin, whereby to provide for displacement of said card with respect to other cards stored in said bin as it is fed to the latter.

8. In punched-card reading apparatus, drum means comprising a pair of axially aligned identical halves of optically transparent material in each of which is formed a circular prism coaxial with said drum means, means for directing light onto ends of said drum means for impringement upon reflective faces of said prisms, light sensitive means for receiving said light as it is reflected by said faces of said prisms radially of said drum means and through peripheral, curved surface portions thereof, means for rotating said drum means about its central axis, and means for holding a punched card over peripheral surface portions of said drum means and in such position with respect to said drum means that data bearing portions of the card are aligned with said light sensitive means and modulate the transmission of said reflected light onto the latter.

9. In optical reading apparatus, rotating drum means for transporting a record medium that bears optically readable indicia, said drum means comprising optically transparent material in which is formed a circular prism coaxial with the drum means, means for directing light onto the end of said drum means for reflection by said prism through circumferential surface portions of said drum means, mean for transporting said record medium about said circumferential surface portions of said drum means in such a position that reflected light is directed toward said indicia, and means for sensing light as it is so directed.

10. Apparatus according to claim 9, and characterized in that said drum means is rotatable about its major axis, and in that said circumferential surface portions have extending thereover spaced, circumferentially extending belt means disposed and adapted frictionally to engage said record medium as said drum means is rotated, whereby to drive said medium past said means for sensing light.

11. Apparatus according to claim 10, and further characterized in that said indicia are arranged in spaced rows for extension in the direction of the circumference of said drum means, and said belt means comprises individual belts disposed for frictional engagement with said record medium in regions thereof intermediate said rows of indicia, said belts being effective to mask the reflected light for direction thereof onto the appropriate sensing means for each row of indicia.

12. Apparatus according to claim 10, and characterized by the inclusion of arcuate guide means for urging said record medium into frictional driven engagement with said belt means.

13. In optical reading apparatus, rotating drum means for transporting a record medium that bears optically readable indicia, including a pair of axially aligned identical halves of optically transparent material in each of which is formed a circular right angle prism, means for directing light onto the ends of said drum means for reflection by said prisms through circumferential surface portions of said drum means, means for transporting said record medium about circumferential surface portions of said drum means in such position that reflected light is directed toward said indicia, and means for sensing light as it is so directed.

References Cited

UNITED STATES PATENTS 1,627,701 5/1927 Hall ................ 178—13

OTHER REFERENCES

Dryjanski et al.: "Optical Reader," IBM Technical Disclosure Bulletin, vol. 7, No. 7, December 1964.

MAYNARD R. WILBUR, *Primary Examiner.*

T. J. SLOYAN, *Assistant Examiner.*

U.S. Cl. X.R.

250—219; 350—286